(12) United States Patent
Nakane et al.

(10) Patent No.: US 6,810,336 B2
(45) Date of Patent: Oct. 26, 2004

(54) TORQUE SENSOR HAVING A MAGNET AND A MAGNETIC SENSOR

(75) Inventors: Naoki Nakane, Toyota (JP); Shigetoshi Fukaya, Toyota (JP); Kenji Takeda, Okazaki (JP)

(73) Assignee: Denso Corporation, Kariya (JP)

( * ) Notice: Subject to any disclaimer, the term of this patent is extended or adjusted under 35 U.S.C. 154(b) by 48 days.

(21) Appl. No.: 10/396,494

(22) Filed: Mar. 26, 2003

(65) Prior Publication Data

US 2003/0233889 A1 Dec. 25, 2003

(30) Foreign Application Priority Data

Jun. 20, 2002 (JP) .......................... 2002-180010

(51) Int. Cl.$^7$ ................................................ G01B 7/14
(52) U.S. Cl. ................................. 702/43; 702/151
(58) Field of Search ........................ 702/41, 43, 151; 73/862.321, 862.325–862.331, 862.335–862.337, 379.03, 1.75, 1.79; 324/207.13–207.15, 207.22, 207.25; 341/15

(56) References Cited

U.S. PATENT DOCUMENTS

| | | | |
|---|---|---|---|
| 4,398,419 A | * 8/1983 | Iwasaki ................... 324/207.25 |
| 4,682,104 A | * 7/1987 | Lombard et al. ......... 324/207.17 |
| 4,784,002 A | 11/1988 | Io et al. |
| 4,838,074 A | * 6/1989 | Morishita et al. ......... 73/862.325 |
| 4,887,461 A | * 12/1989 | Sugimoto et al. ......... 73/862.334 |
| 4,983,915 A | * 1/1991 | Rossi ..................... 324/207.17 |
| 4,984,474 A | 1/1991 | Matsushima et al. |
| 5,257,828 A | * 11/1993 | Miller et al. ................ 180/446 |
| 5,637,997 A | * 6/1997 | Hore et al. ............ 324/207.16 |
| 6,532,831 B2 | * 3/2003 | Jin et al. ................ 73/862.331 |
| 6,568,284 B1 | * 5/2003 | Reichl et al. .......... 73/862.333 |
| 6,701,792 B2 | * 3/2004 | Laidlaw ................. 73/862.329 |
| 6,707,292 B2 | * 3/2004 | Viola ....................... 324/207.2 |
| 2002/0089324 A1 | * 7/2002 | Miyata et al. ........... 324/207.2 |
| 2002/0189371 A1 | 12/2002 | Nakane et al. |

FOREIGN PATENT DOCUMENTS

| EP | WO 02/071019 A1 | 9/2002 |
| JP | A06-281513 | 10/1994 |
| JP | A-08-159887 | 6/1996 |

* cited by examiner

Primary Examiner—Marc S. Hoff
Assistant Examiner—Craig Steven Miller
(74) Attorney, Agent, or Firm—Posz & Bethards, PLC

(57) ABSTRACT

A torque sensor includes first and second shafts, an elastic shaft, a magnet, a pair of ring plates, and a magnetic sensor. The elastic shaft connects the first and second shafts coaxially. The magnet is fixed to the first shaft. The pair of ring plates is fixed to the second shaft, and faces each other in an axial direction of the elastic shaft so that the pair of ring plates sandwiches the magnet. The magnetic sensor is disposed in a gap between the pair of ring plates so that the magnetic sensor detects a magnetic flux density in the gap. Each ring plate includes a convexity and a concavity in an inner circumference of each ring plate, respectively. The pair of ring plates is rotatable against the magnet in accordance with a twist of the elastic shaft so that the rotation of the ring plates causes the magnetic flux density in the gap.

21 Claims, 16 Drawing Sheets

TORQUE SENSOR HAVING A MAGNET AND A MAGNETIC SENSOR

CROSS REFERENCE TO RELATED APPLICATION

This application relates to and incorporates herein by reference Japanese Patent Application No. 2002-180010 filed on Jun. 20, 2002.

1. Field of the Invention

The present invention relates to a torque sensor with a magnet and a magnetic sensor. For example, the torque sensor detects a torque, which is applied to a transmitting mechanism for transmitting a rotation torque in an electric power steering system of an automotive vehicle.

2. Background of the Invention

A magnetic sensor with a magnet according to a related art is proposed, for example, in JP-A-06-281513. In this sensor, a magnet and a magnetic sensor are fixed to two ends of a torsion bar, respectively. When a torque is applied to the torsion bar, the torsion bar is twisted and a relative angular position between the magnet and the magnetic sensor changes, so that the magnetic sensor detects the position change that is in proportion to the torque. However, the magnetic sensor is fixed to the torsion bar, so that an electrical connection is necessitated for supplying an electric power to the magnetic sensor and for receiving a detection signal from the magnetic sensor. For example, the electrical connection is performed by a slip-ring and a brush. The connection between the slip-ring and the brush has a low reliability.

Another magnetic sensor is also proposed in JP-A-08-159867. In this case, a distortion of the torsion bar is converted to a motion in an axial direction by a gear system. The magnetic sensor can be fixed to a housing, so that no electrical connection is needed. However, the gear system becomes complicated. Moreover, the gear may back-lash or be abraded, so that an error or a response delay may be occurred.

SUMMARY OF THE INVENTION

The present invention has an object to simplify a detection mechanism of a torque sensor without any electrical connection.

In the present invention, a torque sensor includes first and second shafts, an elastic shaft, a magnet, first and second ring plates, and a magnetic sensor. The elastic shaft connects the first and second shafts coaxially, and is twistable in accordance with a distortion torque applied to the elastic shaft. The magnet is made of hard magnetic material, is magnetized in an axial direction of the elastic shaft so that the magnet provides a magnetic field around the magnet, and is fixed to the first shaft. The first and second ring plates are made of soft magnetic material, are disposed in the magnetic field provided by the magnet, are fixed to the second shaft, and face each other in the axial direction so that the first and second ring plates sandwich the magnet. The magnetic sensor is disposed in a gap between the first and second ring plates so that the magnetic sensor detects a magnetic flux density in the gap.

Each of the first and second ring plates includes a convexity and a concavity in an inner circumference of each ring plate, respectively. The convexity and the concavity are alternately disposed in a circumferential direction of each ring plate. The convexity of the first ring plate faces the convexity of the second ring plate in the axial direction. The concavity of the first ring plate also faces the concavity of the second ring plate in the axial direction. The first and second ring plates are rotatable against the magnet in accordance with a twist of the elastic shaft, so that the magnetic flux flows in the gap. Thus, the magnetic sensor detects the magnetic flux density in the gap in accordance with a rotation of the first and second ring plates.

In this torque sensor, the magnetic sensor does not contact the ring plates or the magnet. Therefore, the torque sensor has a high reliability.

Preferably, the total number of convexities and concavities in each ring plate are equal to the number of pairs of N pole and S pole in the magnet. In this case, the convexity and the concavity in each ring plate can be positioned easily between the N pole and the S pole of the magnet.

Preferably, the convexity and the concavity are disposed on the entire inner circumference of each ring plate at regular angular intervals so that the convexity and the concavity have the same width in the circumferential direction. The N pole and the S pole are disposed on the entire circumference of the magnet at regular angular intervals so that the N pole and the S pole have the same width in the circumferential direction. Thus, the width of the convexity or the concavity is substantially equal to the width of the N pole or the S pole. In this case, a positioning error between the convexity or the concavity and the N pole or the S pole is averaged and substantially cancelled.

Preferably, when the elastic shaft is not twisted, i.e., when the elastic shaft is at a neutral position, a center of each convexity and concavity in the circumferential direction is substantially coincident with a boundary between the N pole and the S pole of the magnet in the circumferential direction. In this case, the neutral position of the elastic shaft is not shifted even when a magnetic force of the magnet changes in accordance with an ambient temperature change. So an accuracy of the torque sensor around the neutral position is secured easily.

Preferably, the torque sensor includes a spacer, which is made of nonmagnetic material, is disposed between the first and second ring plates, and is disposed outside of the magnet. The spacer prevents an iron powder from adhering the magnet; so that the magnetic force of the magnet does not decrease.

Preferably, the torque sensor includes a plurality of concentration rings. Each concentration ring is disposed on the first and second ring plates, respectively, and is made of soft magnetic material. Each concentration ring concentrates a magnetic flux flowing from the magnet through each ring plate, respectively. The magnetic sensor is disposed between the concentration rings so that the magnetic sensor detects a magnetic flux density concentrated by the concentration rings. In this case, a total magnetic flux flowing from the entire ring plate is averaged, and the magnetic flux density is concentrated. A detection error caused by a dispersion of manufacturing parts or by a dispersion of assembling parts of the torque sensor, a centering deviation between the first and second shafts are suppressed by the concentration of the magnetic flux.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT (First Embodiment)

Figure 1:
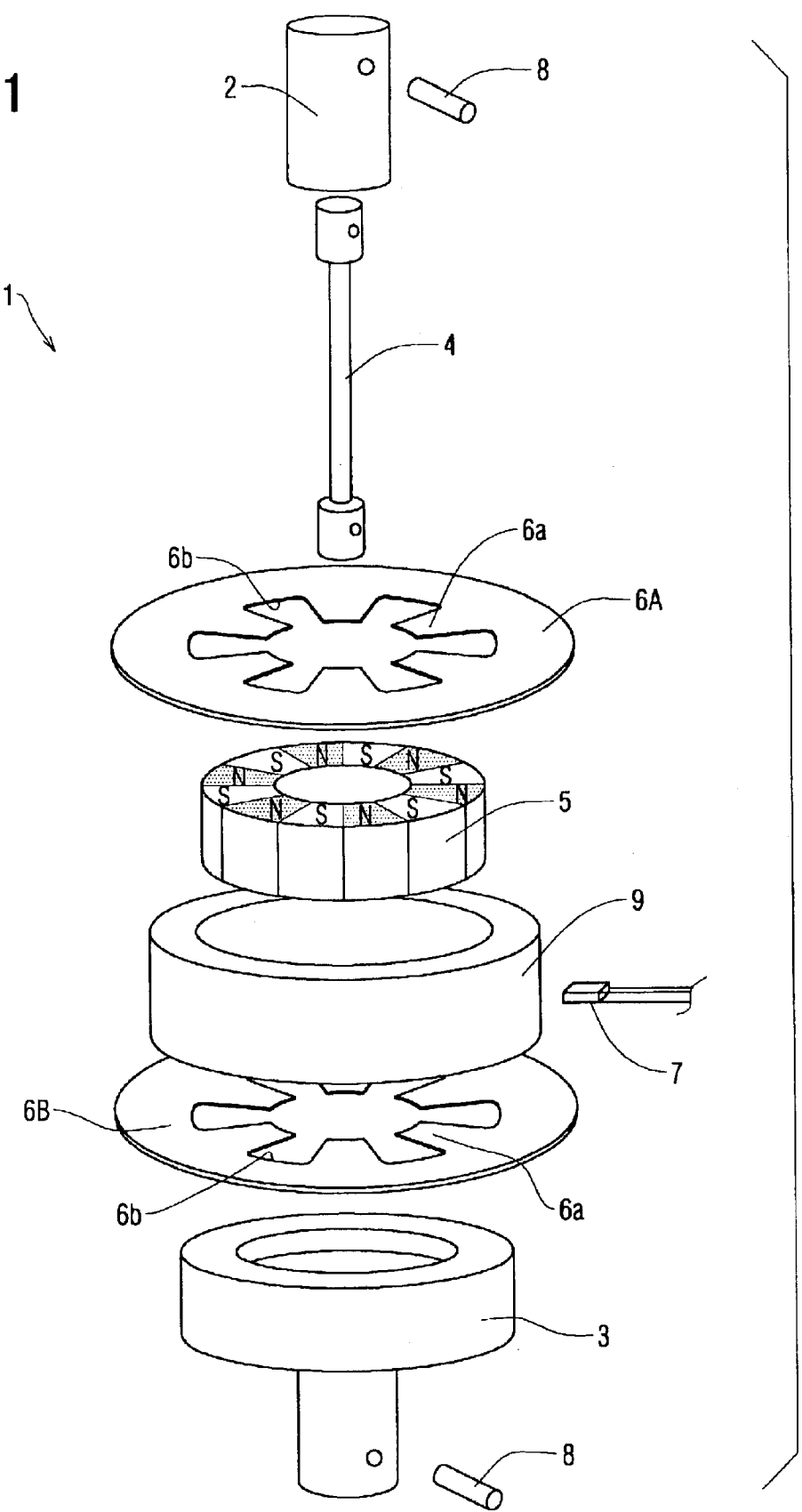
FIG. 1 is an exploded perspective view showing a torque sensor according to the first embodiment of the present invention.

A torque sensor according to the first embodiment is shown in FIG. 1. This torque sensor 1 is used, for example, in an electric power steering system of an automotive vehicle. The torque sensor 1 is disposed between an input shaft 2 and an output shaft 3, which provide a steering shaft. The torque sensor 1 is capable of detecting a steering wheel torque applied to the steering shaft.

The torque sensor 1 includes a torsion bar 4, a magnet 5, a pair of magnetic yokes 6A, 6B, a magnetic sensor 7, and so on. The torsion bar 4 is made of elastic material, and connects the input shaft 2 and the output shaft 3. The torsion bar 4, the input shaft 2, and the output shaft 3 are aligned in a coaxial line. The magnet 5 is made of hard magnetic material, and is fixed to an end of the input shaft 2. The pair of magnetic yokes 6A, 6B is made of soft magnetic material, and is fixed to an end of the output shaft 3. The magnetic sensor 7 detects a magnetic flux density between the pair of magnetic yokes 6A, 6B.

Figure 2:
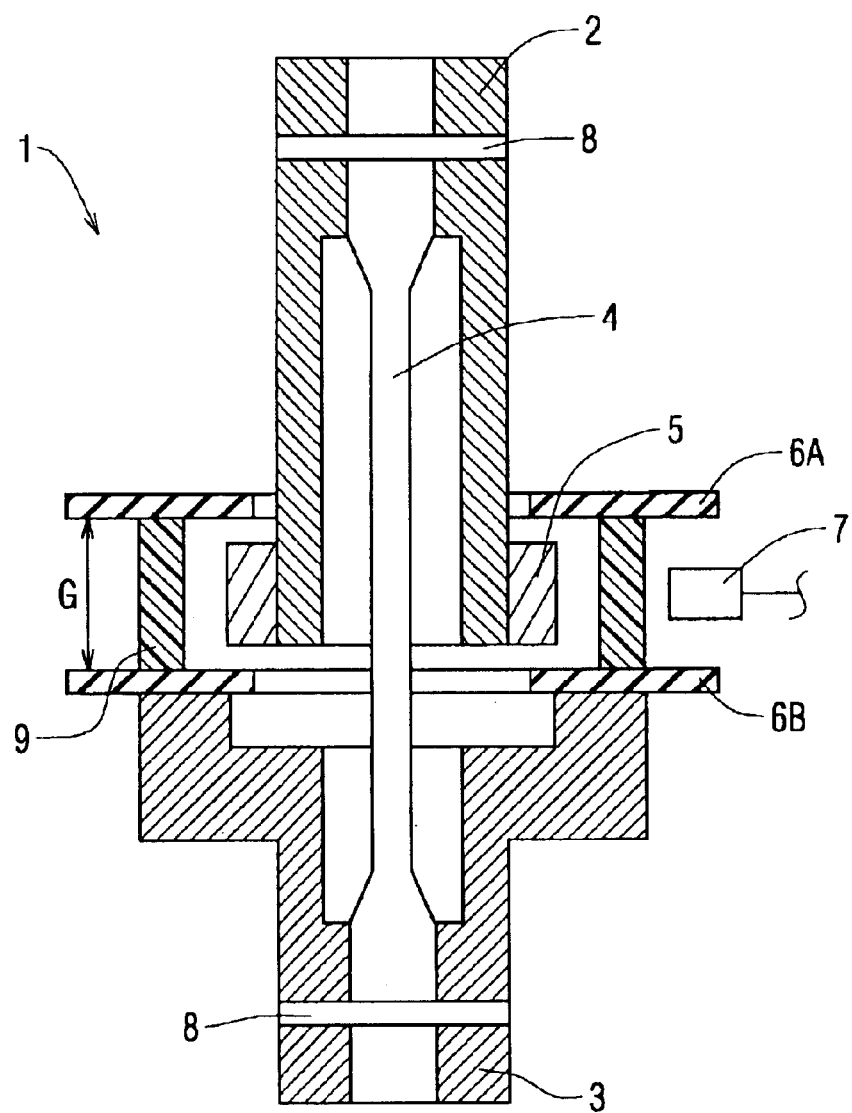
FIG. 2 is a cross-sectional view showing the torque sensor according to the first embodiment.

As shown in FIG. 2, two ends of the torsion bar 4 are fixed to the input and output shafts 2, 3 by pins 8, respectively. The torsion bar 4 has a predetermined elastic character about applied torque versus distortion of the torsion bar 4. When a torque is applied to the torsion bar 4, the torsion bar 4 is twisted, and the input shaft 2 and the output shaft 3 rotate, respectively. Thus, a relative angular position between the input shaft 2 and the output shaft 3 is changed.

Figure 3A:
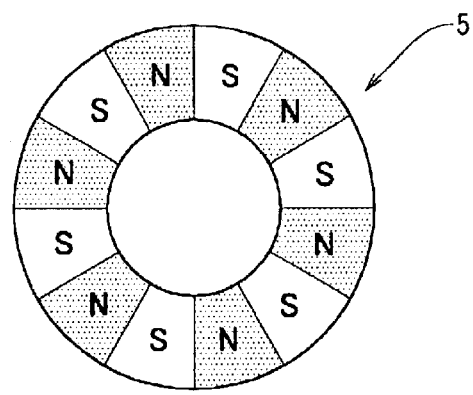
FIG. 3A is a top plan view showing a magnet of the torque sensor in FIG. 1.
Figure 3B:
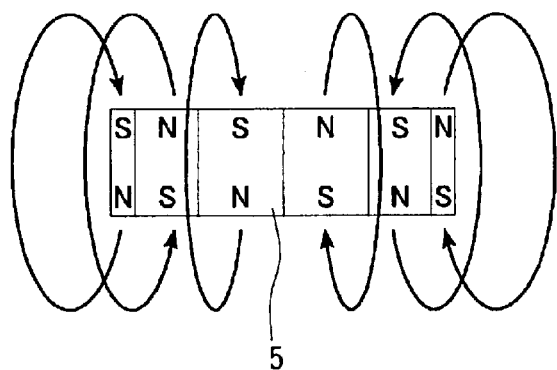
FIG. 3B is a schematic side view showing the magnet of the torque sensor in FIG. 1.

As shown in FIGS. 3A and 3B, the magnet 5 has a cylindrical shape. In FIG. 3B, arrow represents a magnetic flux, and arrows in the following figures represent the magnetic flux, similarly. The magnet 5 is magnetized in the axial direction, and N poles and S poles of the magnet 5 are disposed alternately in the circumferential direction of the magnet 5. The magnet 5 has, for example, twelve pairs of N pole and S pole.

Figure 4:
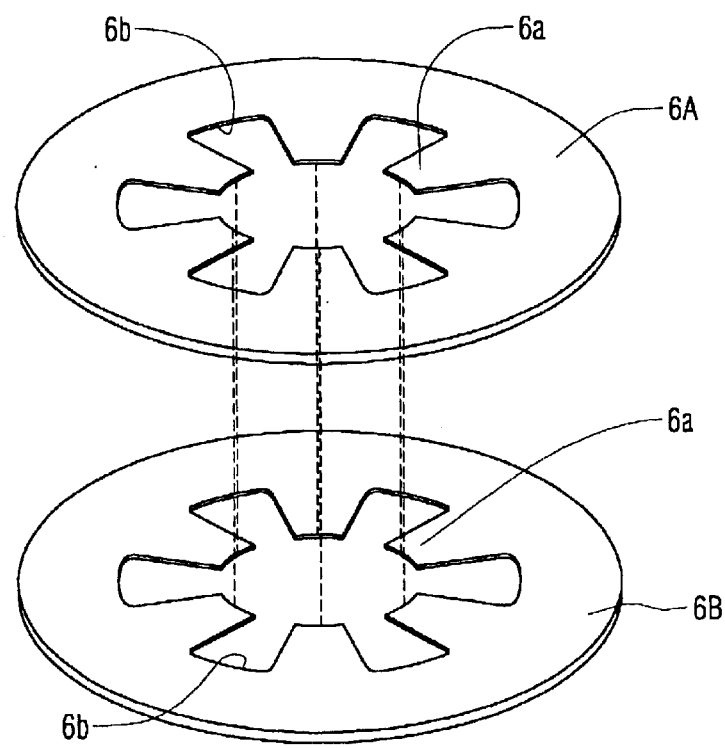
FIG. 4 is a front perspective view showing a magnetic yoke of the torque sensor in FIG. 1.

Each magnetic yoke 6A, 6B has a ring plate shape, and includes a convexity portion 6a and a concavity portion 6b, respectively, as shown in FIGS. 1 and 4. The magnetic yokes 6A, 6B are disposed on upper and lower sides of the magnet 5 so that the magnet 5 is sandwiched between the magnetic yokes 6A, 6B. The magnet 5 partially faces the convexity portion 6a of the magnetic yoke 6A, 6B. The convexity portion 6a and the concavity portion 6b are alternately disposed on an entire inner circumference of the magnetic yoke 6A, 6B at regular angular intervals. The total number of convexities and concavities in the convexity portion 6a and the concavity portion 6b are twelve, which is equal to the number of pairs of N pole and S pole. Moreover, the width of the convexity or the concavity in the circumferential direction is almost the same as the width of the N pole or the S pole in the circumferential direction. As shown in FIG. 4, the convexity portion 6a of the upper magnetic yoke 6A faces the convexity portion 6a of the lower magnetic yoke 6B, and similarly the concavity portion 6b of the upper magnetic yoke 6A faces the concavity portion 6b of the lower magnetic yoke 6B.

A spacer 9 is disposed between the upper and lower magnetic yokes 6A, 6B, and is disposed outside of the magnet 5, as shown in FIG. 2. The spacer 9 is made of nonmagnetic material, and has a cylindrical shape. Therefore, a gap G is formed between the upper and lower magnetic yokes 6A, 6B.

Figure 5A:
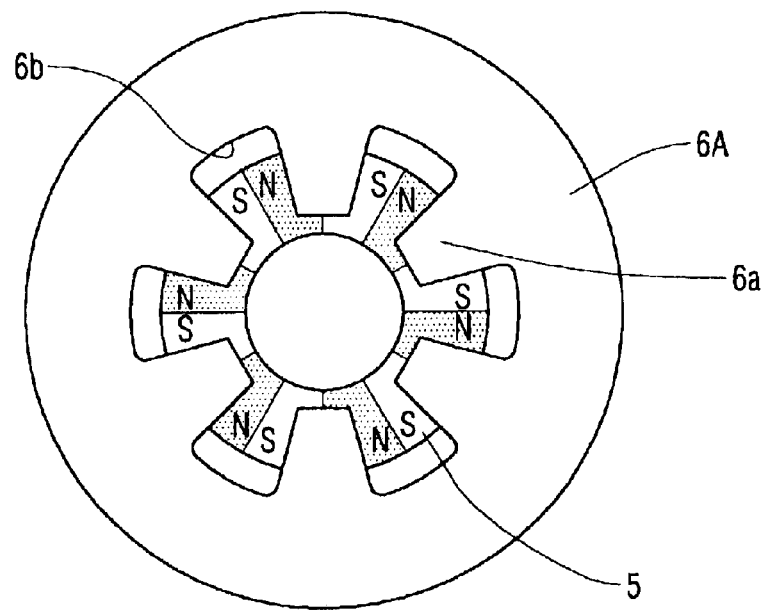
FIG. 5A is a top plan view showing the magnetic yoke and the magnet of the torque sensor in FIG. 1.

As shown in FIG. 5A, when the torsion bar 4 is not twisted, i.e., when the torque is not applied between the input shaft 2 and the output shaft 3, the center of each convexity or concavity in the convexity portion 6a or the concavity portion 6b is coincident with a boundary between the N pole and the S pole of the magnet 5, respectively.

The magnetic sensor 7 is disposed in the gap G between the upper and lower magnetic yokes 6A, 6B. The magnetic sensor 7 detects a magnetic flux density in the gap G. However, the magnetic sensor 7 does not contact the magnetic yokes 6A, 6B, the spacer 9, or the magnet 5. The magnetic sensor 7 is mounted on a housing and the like (not shown), and is disposed at a predetermined position in the gap G. The magnetic sensor 7 is formed of, for example, a Hall element, Hall element integrated circuit, a magneto-resistance device, or the like. The magnetic sensor 7 detects the magnetic flux density, converts the magnetic flux density to a voltage signal, and outputs the voltage signal.

Figure 5B:
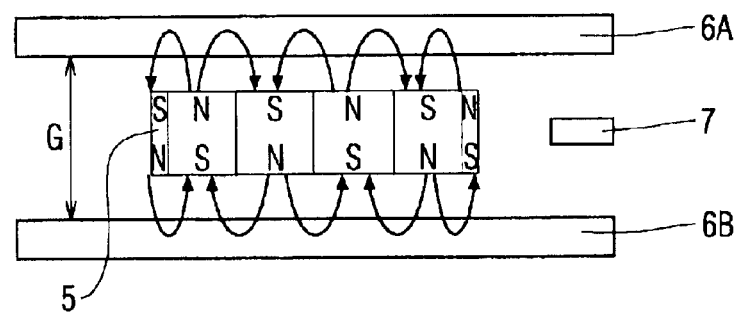
FIG. 5B is a schematic side view showing the magnetic yoke and the magnet of the torque sensor in FIG. 1.

The torque sensor 1 operates as follows. When a distortion torque is not applied between the input shaft 2 and output shaft 3, i.e., when the torsion bar 4 is not twisted and is at a neutral position, as shown in FIGS. 5A and 5B, the center of each convexity or concavity in the convexity portion 6a or the concavity portion 6b is coincident with a boundary between the N pole and the S pole of the magnet 5. In this case, a magnetic field line flows from the N pole to the S pole of the magnet 5 through the magnetic yoke 6A, 6B. Therefore, the number of magnetic field lines flowing from the N pole are equal to the number of magnetic field lines returning to the S pole, so that the magnetic field lines are shorted inside of each magnetic yoke 6A, 6B, respectively. As a result, a magnetic flux does not flow between the upper and lower magnetic yokes 6A, 6B, and the magnetic sensor 7 detects no magnetic flux density, i.e., the magnetic flux density detected by the magnetic sensor 7 is almost zero.

Figure 6A:
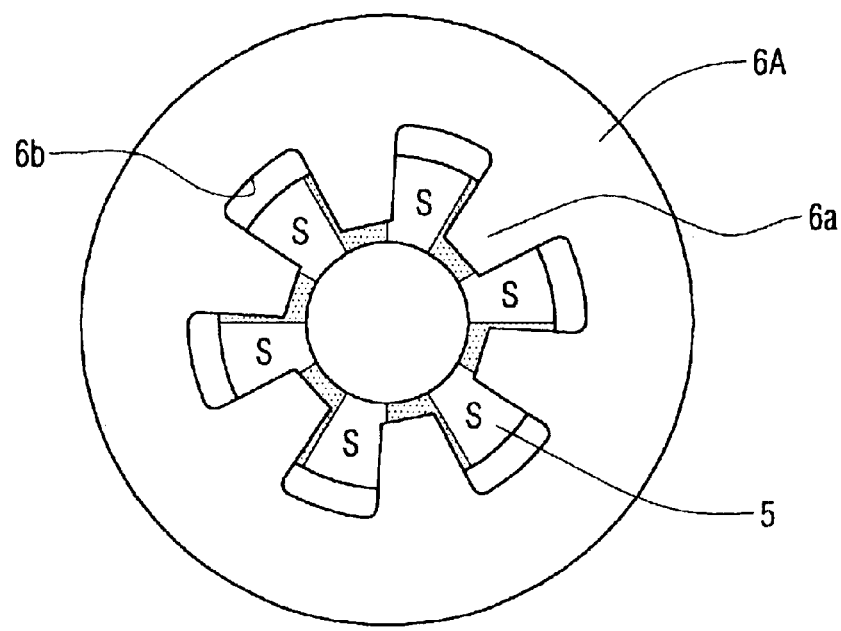
FIG. 6A is a top plan view showing the magnetic yoke and the magnet of the torque sensor in FIG. 1.
Figure 6B:
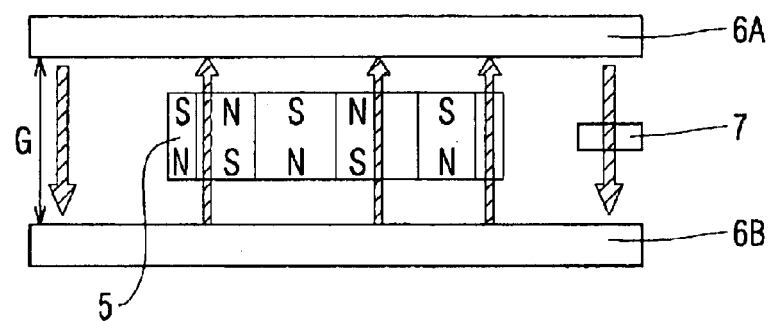
FIG. 6B is a schematic side view showing the magnetic yoke and the magnet of the torque sensor in FIG. 1.

When the torque is applied between the input shaft 2 and the output shaft 3, the torsion bar 4 is twisted. Then, the pair of magnetic yokes 6A, 6B, which is fixed to the output shaft 3, rotates relatively against the magnet 5, which is fixed to the input shaft 2. Therefore, the center of each convexity or concavity in the convexity portion 6a or the concavity portion 6b is not coincident with the boundary between the N pole and the S pole of the magnet 5. When the torsion bar 4 rotates clockwise, the S pole of the magnet 5 faces the concavity of the upper magnetic yoke 6A, as shown in FIGS. 6A and 6B. Contrastively, the N pole, which is opposite to the S pole of the magnet 5 in the axial direction, faces the concavity of the lower magnetic yoke 6B. When the torsion bar 4 rotates counter clockwise, as shown in FIGS. 7A and 7B, the N pole of the magnet 5 faces the concavity of the upper magnetic yoke 6A, and the S pole faces the concavity of the lower magnetic yoke 6B.

When the concavity portion 6b of the upper magnetic yoke 6A faces the S pole of the magnet 5, i.e., when the convexity portion 6a of the upper magnetic yoke 6A faces the N pole of the magnet 5, as shown in FIGS. 6A and 6B, the magnetic field lines flowing from the N pole increases inside of the upper magnetic yoke 6A. In this case, the convexity portion 6a of the lower magnetic yoke 6B faces the S pole of the magnet 5, so that the magnetic field lines returning to the S pole increases inside of the lower magnetic yoke 6B. As a result, as shown in FIG. 6B, the magnetic flux flows between the upper and lower magnetic yokes 6A, 6B (i.e., in the gap G), and the magnetic flux density increases from zero.

Figure 7A:
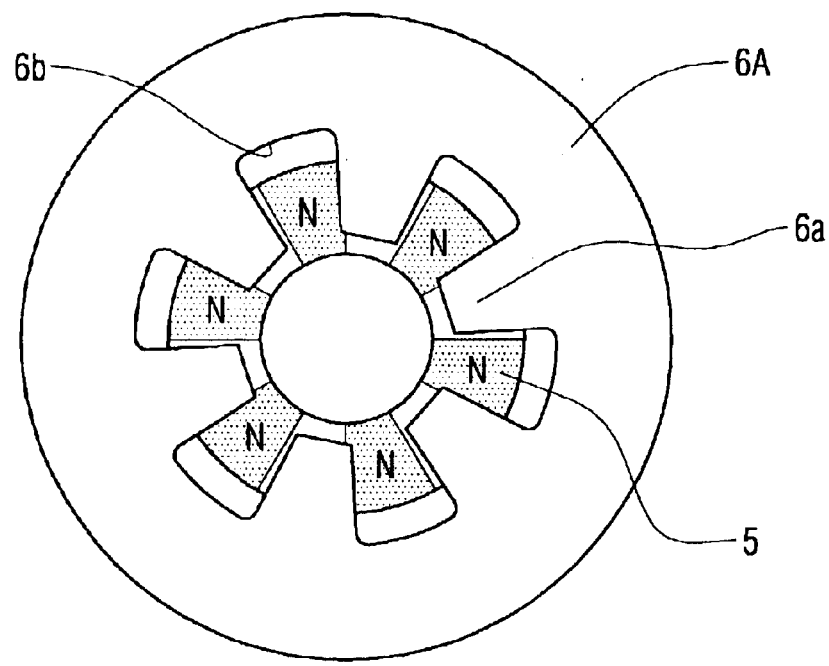
FIG. 7A is a top plan view showing the magnetic yoke and the magnet of the torque sensor in FIG. 1.
Figure 7B:
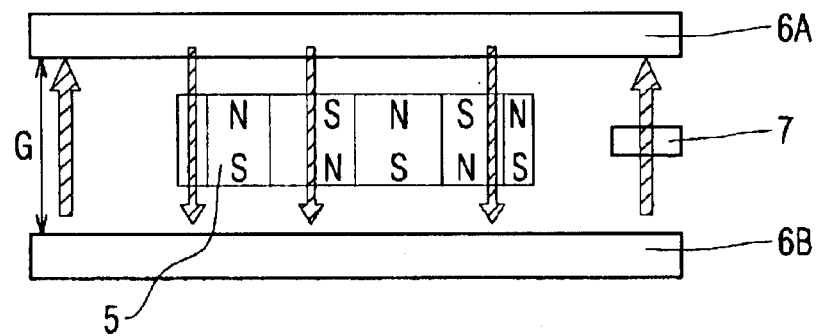
FIG. 7B is a schematic side view showing the magnetic yoke and the magnet of the torque sensor in FIG. 1.

When the concavity portion 6b of the upper magnetic yoke 6A faces the N pole of the magnet 5, i.e., when the convexity portion 6a of the upper magnetic yoke 6A faces the S pole of the magneti 5, as shown in FIGS. 7A and 7B, the magnetic field lines returning to the S pole increases inside of the upper magnetic yoke 6A, and the magnetic field lines flowing from the N pole increases inside of the lower magnetic yoke 6B. Accordingly, the magnetic flux flows in the gap G, and the magnetic flux density also increases from zero.

Figure 8:
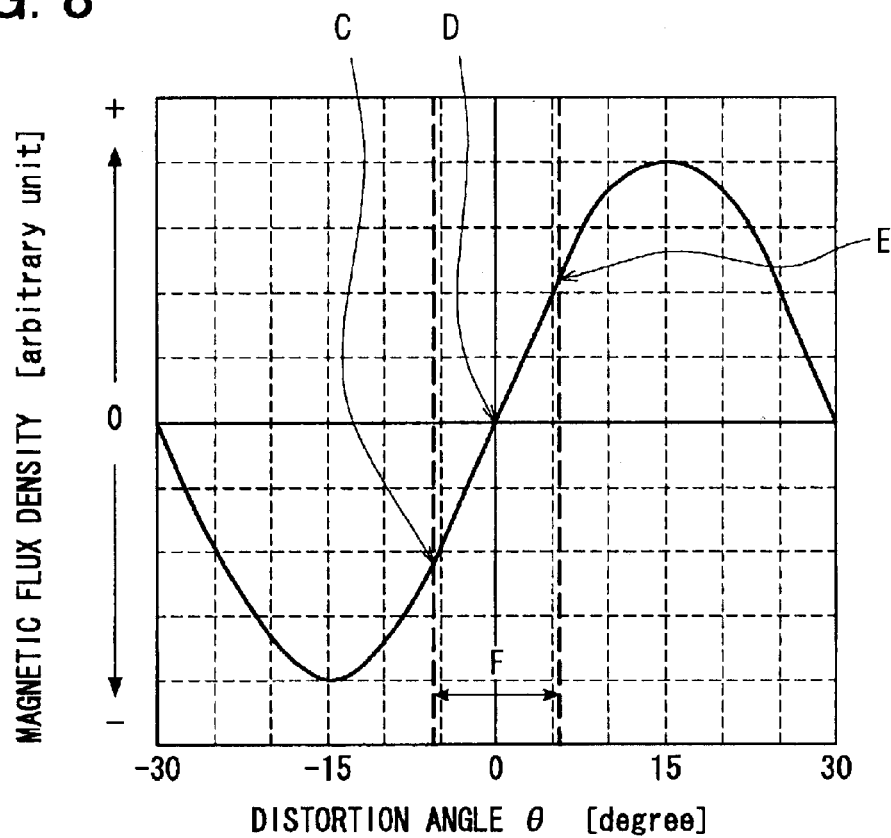
FIG. 8 is a graph showing a relation between a distortion angle of a torsion bar and a magnetic flux density in a gap.

The magnetic flux density in the gap G is substantially in proportional to the distortion of the torsion bar 4, as shown in FIG. 8. In FIG. 8, a horizontal axis represents a distortion angle $\theta$ of the torsion bar 4, and a vertical axis represents the magnetic flux density in the gap G. The torque sensor 1 is used in a working range F of the distortion angle. D represents a state of the torsion bar 4 that is not twisted and is at a neutral position. C and E represent states of the torsion bar 4 that are twisted to the maximum distortion angel $\theta$ of the working range F. The magnetic flux density reverses polarity in accordance with a distortion direction of the torsion bar 4, i.e., in accordance with a rotational direction of the steering wheel. The magnetic sensor 7 detects the magnetic flux density and the polarity as the distortion direction, and outputs a voltage signal in proportional to the magnetic flux density. As a result, the torque sensor 1 detects not only the rotational direction of the steering wheel and but also the torque applied to the steering wheel by a driver of an automotive vehicle.

In this embodiment, the torque sensor 1 is inserted in the gap G, and does not contact the magnetic yokes 6A, 6B or the magnet 5. Therefore, the magnetic sensor 7 has no contact portion, so that the torque sensor 1 can have a high reliability. Moreover, when the torsion bar 4 is not twisted, the center of each convexity or concavity in the convexity portion 6a or the concavity portion 6b is coincident with the boundary between the N pole and the S pole of the magnet 5. This neutral position of the torsion bar 4 is not shifted even when a magnetic force of the magnet 5 changes in accordance with an ambient temperature change. So an accuracy of the magnetic sensor 1 around the neutral position of the torsion bar 4 is secured easily.

Further, the total number of convexities and concavities in the convexity portion 6a and the concavity portion 6b are equal to the number of pairs of N pole and S pole, so that the convexity portion 6a and the concavity portion 6b can be positioned easily between the N pole and the S pole of the magnet 5. The width of each convexity or concavity in the circumferential direction is substantially equal to the width of each N pole or S pole in the circumferential direction, and the convexity portion 6a and the concavity portion 6b are disposed alternately on the entire inner circumference of the magnetic yoke 6A, 6B at regular angular intervals, respectively. The N pole and the S pole are also disposed alternately on the entire magnet 5 at regular angular intervals. Therefore, when the torsion bar 4 is twisted and the relative angular position between the magnet 5 and the pair of magnetic yokes 6A, 6B is changed, a positioning error between the convexity portion 6a or the concavity portion 6b and the N pole or the S pole is averaged and substantially cancelled.

Further, the spacer 9 is disposed between the upper and lower magnetic yokes 6A, 6B, and is disposed outside of the magnet 5. The spacer 9 is made of nonmagnetic material, so that the magnetic flux in the gap G does not flow in the spacer 9. Thus, the magnetic sensor 7 in the gap G can detect the magnetic flux density correctly. Moreover, the spacer 9 prevents an iron powder from adhering to the magnet 5, so that the magnetic force of the magnet 5 does not decrease.

Further, the magnetic yokes 6A, 6B are formed easily without bending, for example. Furthermore, the pair of magnetic yokes 6A, 6B sandwiches the magnet 5, so that the torque sensor 1 is downsized in the axial direction.

Figure 9:
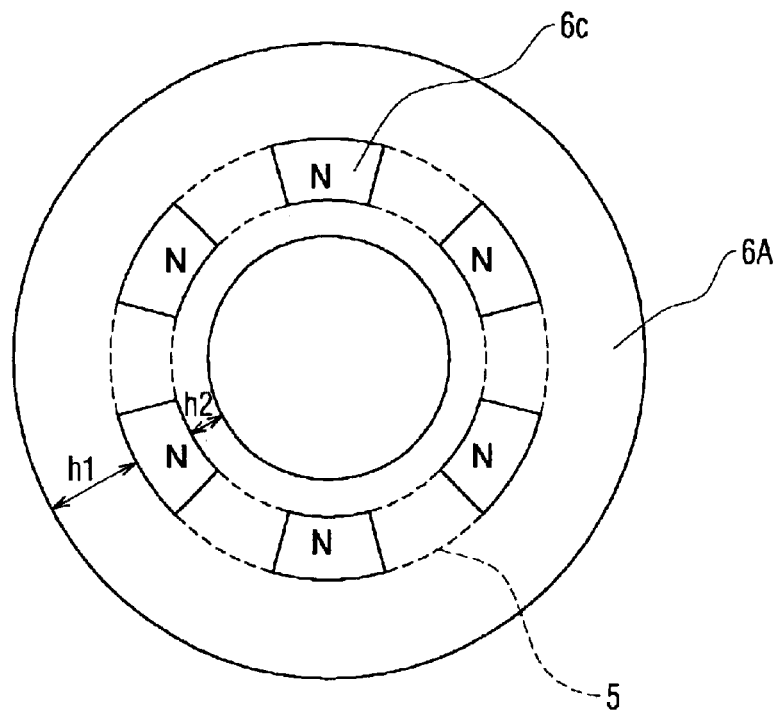
FIG. 9 is a top plan view showing a magnetic yoke and a magnet of a torque sensor according to a modification of the first embodiment.

The first embodiment is modified as follows. As shown in FIG. 9, a pair of magnetic yokes 6A, 6B is prepared to form an opening 6c, instead of the convexity portion 6a and the concavity portion 6b. For example, six openings 6c are disposed alternately at regular angular intervals in the circumferential direction. In FIG. 9, the torsion bar 4 rotates counter clockwise, and the n pole of the magnet 5 faces the opening 6c of the upper magnetic yoke 6A. Similar to the first embodiment, the torque sensor 1 can also detect both the rotational direction of the steering wheel and the torque applied to the steering wheel.

Further, in this modification, the distance h1 between the outer circumference end of the magnetic yoke 6A, 6B and the opening 6c is larger than the distance h2 between the opening 6c and inner circumference end of the magnetic yoke 6A, 6B, so that the surface between the outer circumference end of the magnetic yoke 6A, 6B and the opening 6c is larger than the surface between the opening 6c and inner circumference end of the magnetic yoke 6A, 6B. Therefore, the magnetic flux flowing from the surface between the outer circumference end of the magnetic yoke 6A, 6B and the opening 6c is larger than the magnetic flux flowing from the surface between the opening 6c and inner circumference end of the magnetic yoke 6A, 6B. Then, the magnetic sensor 7 detects the magnetic flux density formed of the larger magnetic flux, when the magnetic sensor 7 is disposed between the outer circumference end of the magnetic yoke 6A, 6B and the opening 6c in the gap G. Accordingly, the magnetic sensor 7 can detect accurately the magnetic flux density in the gap G.

Further modification of the first embodiment is as follows. Although the magnet 5 is fixed to the input shaft 2 and the pair of magnetic yokes 6A, 6B is fixed to the output shaft 3, the magnet 5 can be fixed to one axial end of the torsion bar 4 and the pair of magnetic yokes 6A, 6B can be fixed to the other axial end of the torsion bar 4. Although the convexity portion and the concavity are disposed in the inner circumference of the ring plate, the convexity and the concavity may be disposed the outer circumference of the ring plate.

(Second Embodiment)

Figure 10:
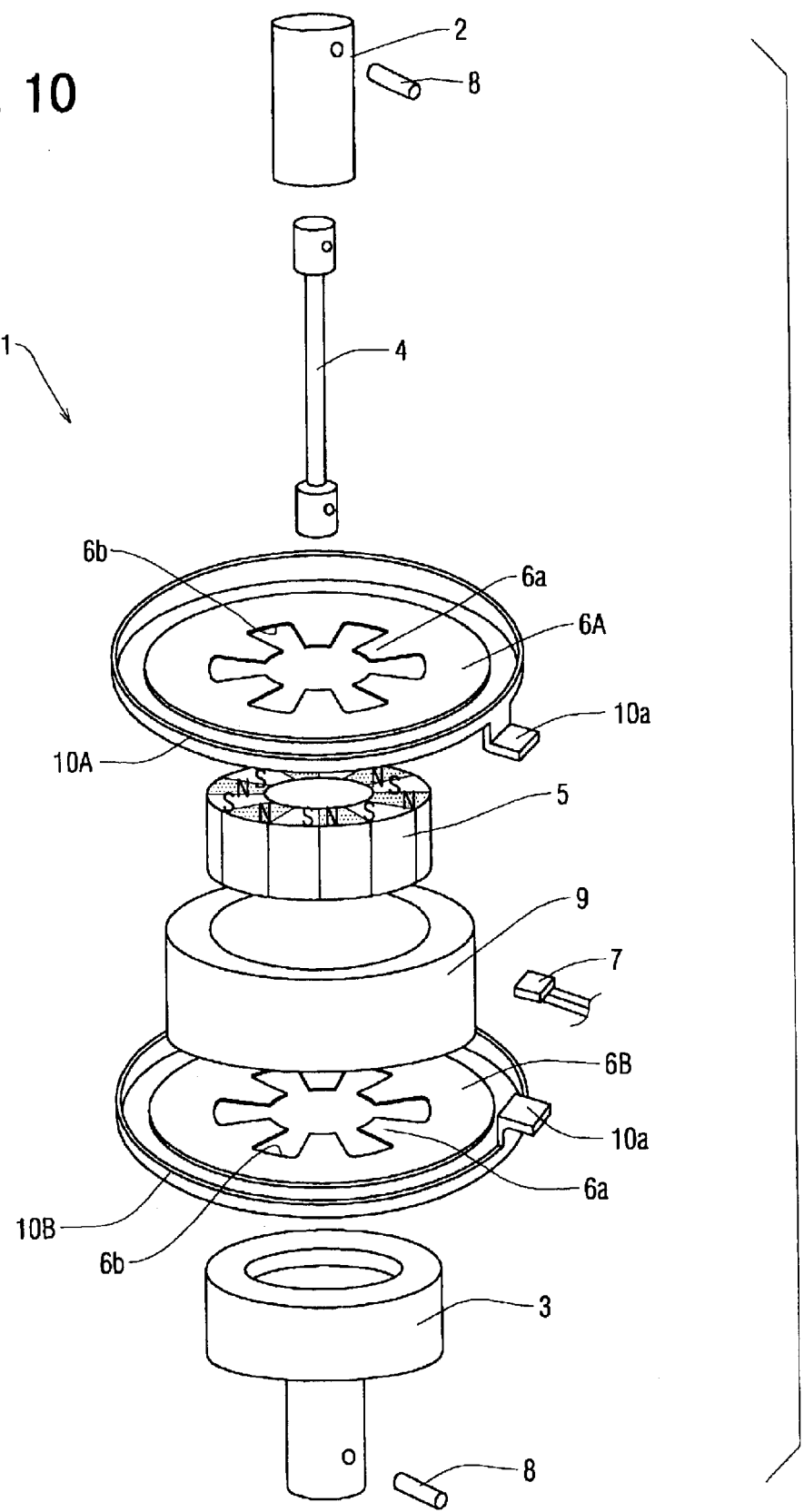
FIG. 10 is an exploded perspective view showing a torque sensor according to the second embodiment of the present invention.

The torque sensor 1 according to the second embodiment includes a pair of concentration rings 10A, 10B, as shown in FIG. 10. The pair of concentration rings 10A, 10B is made of soft magnetic material, and has a ring shape. The pair of concentration rings 10A, 10B are disposed on outer circumference end of the magnetic yokes 6A, 6B, respectively. The concentration ring 10A, 10B includes a concentration portion 10a, which is disposed at a predetermined position in the circumferential direction, and has a plate shape. Two concentration portions 10a of the concentration rings 10A, 10B face each other in the axial direction. The two concentration portions 10a are protruded from the concentration rings 10A, 10B so that the concentration portions 10a approach each other. The magnetic sensor 7 is disposed between the concentration portions 10a so that the magnetic sensor detects a magnetic flux density between the concentration portions 10a.

Figure 11A:
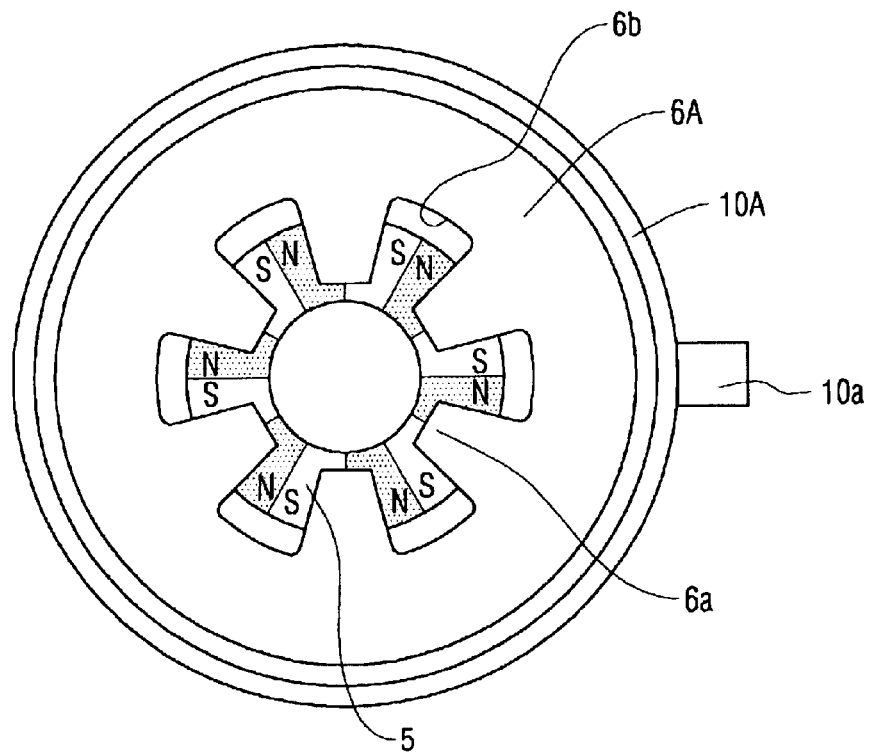
FIG. 11A is a top plan view showing a magnetic yoke and a magnet of the torque sensor in FIG. 10.
Figure 11B:
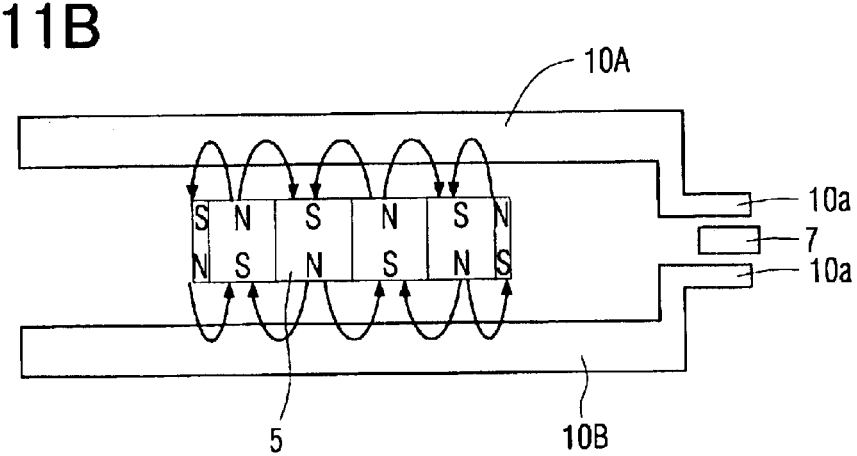
FIG. 11B is a schematic side view showing the magnetic yoke and the magnet of the torque sensor in FIG. 10.
Figure 12A:
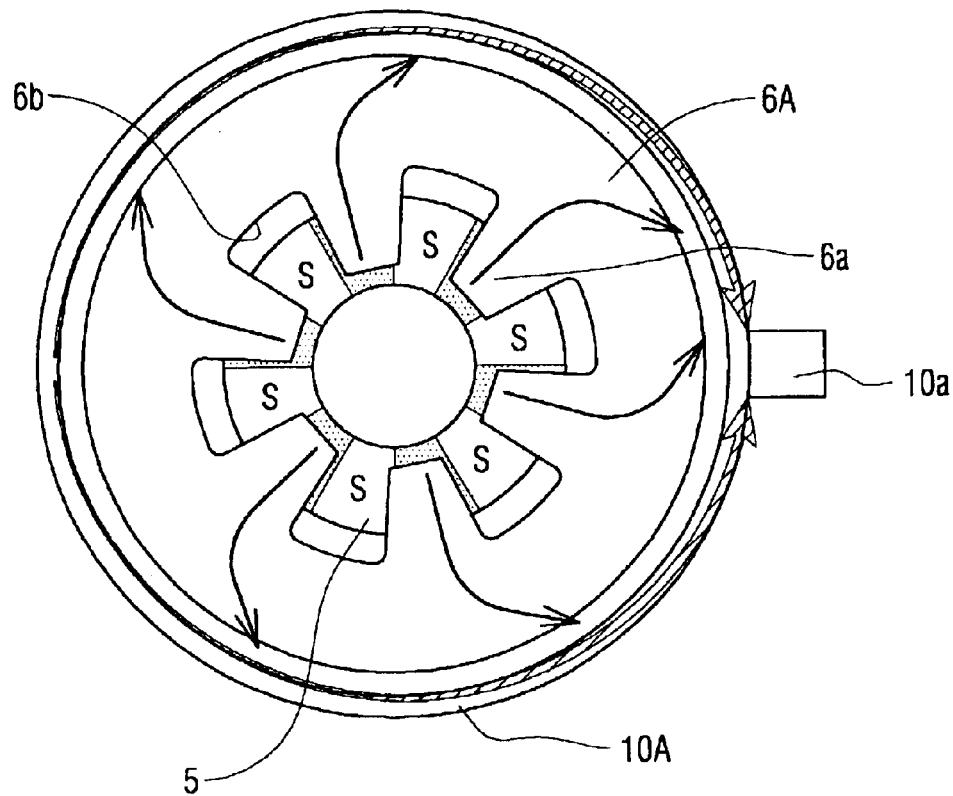
FIG. 12A is a schematic top plan view showing the magnetic yoke and the magnet of the torque sensor in FIG. 10.
Figure 12B:
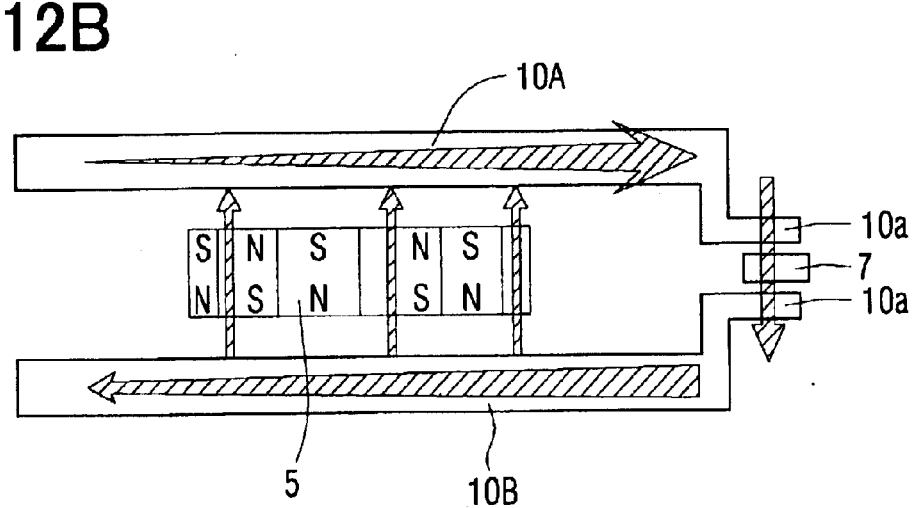
FIG. 12B is a schematic side view showing the magnetic yoke and the magnet of the torque sensor in FIG. 10.
Figure 13A:
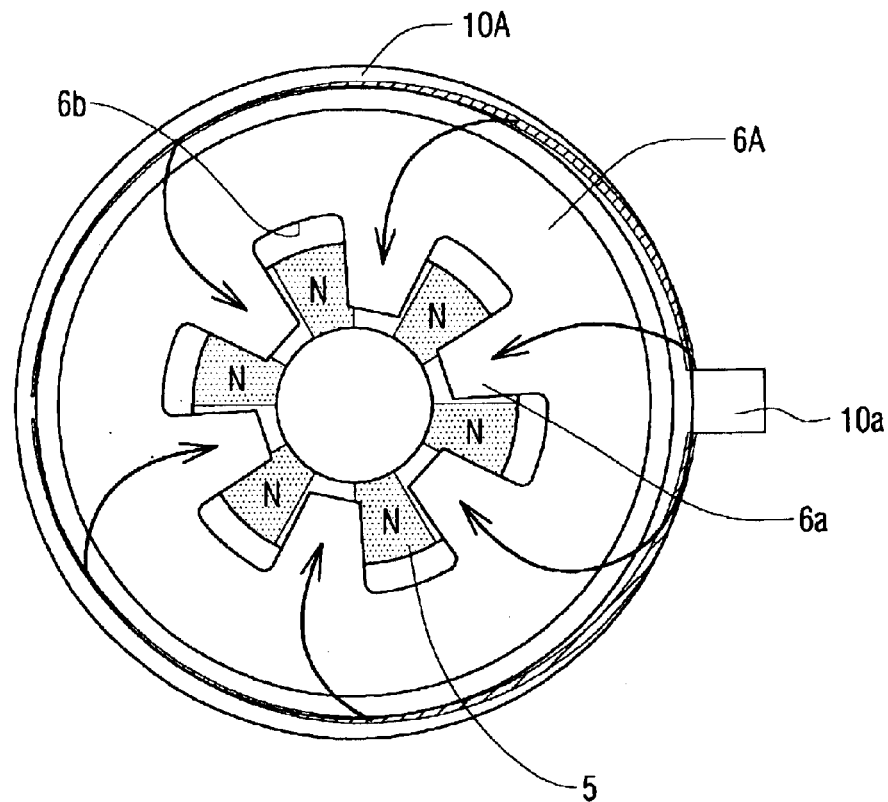
FIG. 13A is a schematic top plan view showing the magnetic yoke and the magnet of the torque sensor in FIG. 10.
Figure 13B:
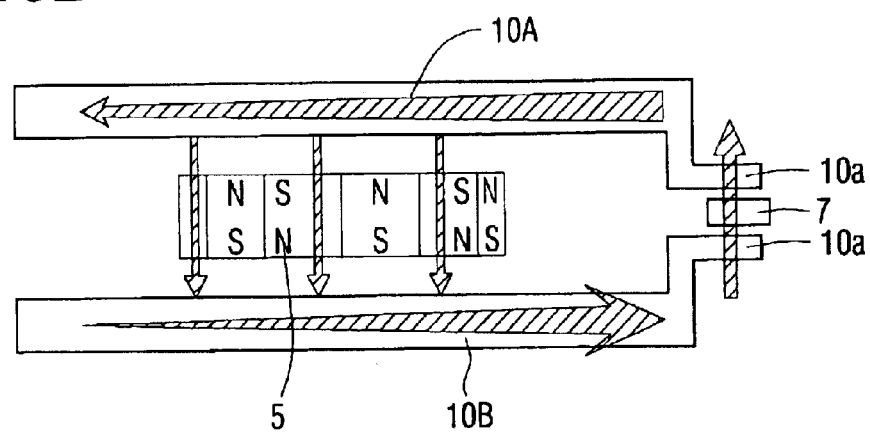
FIG. 13B is a schematic side view showing the magnetic yoke and the magnet of the torque sensor in FIG. 10.
Figure 14:
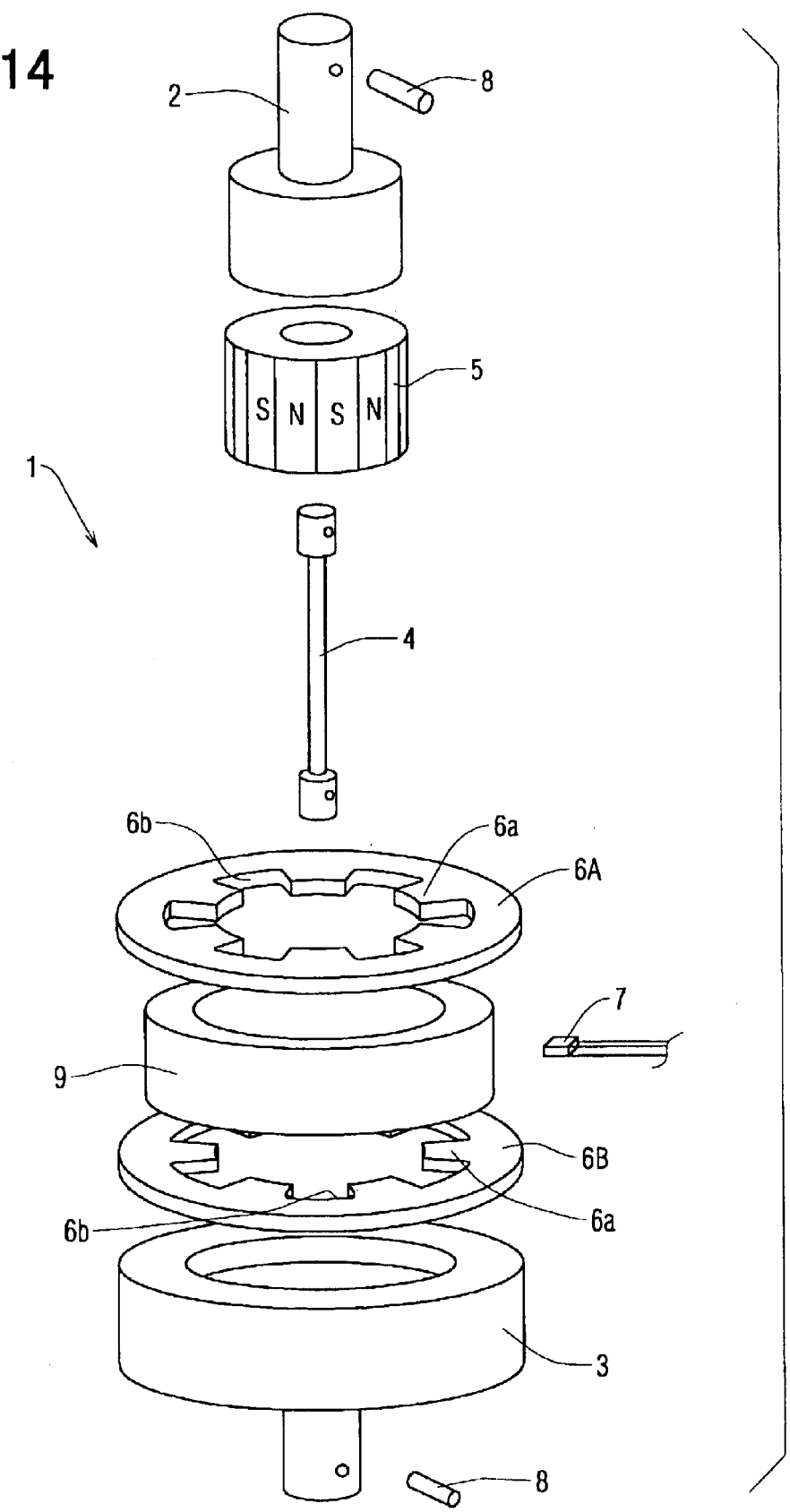
FIG. 14 is an exploded perspective view showing a torque sensor according to the third embodiment of the present invention.

The concentration ring 10A, 10B forms a part of a magnetic circuit, as shown in FIGS. 11–13. In FIGS. 12 and 13, tapered arrows represent a concentration of the magnetic flux. The magnetic flux flowing from the magnet 5 passes through the magnetic yoke 6A, 6B. Then, the magnetic flux is introduced into the concentration ring 10A, 10B, and is concentrated in the concentration portion 10a. The magnetic sensor 7 detects the concentrated magnetic flux density between the concentration portions 10a. A total magnetic flux flowing from the entire circumference of the magnetic yoke 6A, 6B is summed up and averaged, and thus the magnetic flux density is concentrated. Therefore, a detection error caused by a dispersion of manufacturing parts or by a dispersion of assembling parts of the torque sensor 1, a centering deviation between the input shaft 2 and the output shaft 3, are suppressed by the concentration of the magnetic flux density.

(Third Embodiment)

Figure 15:
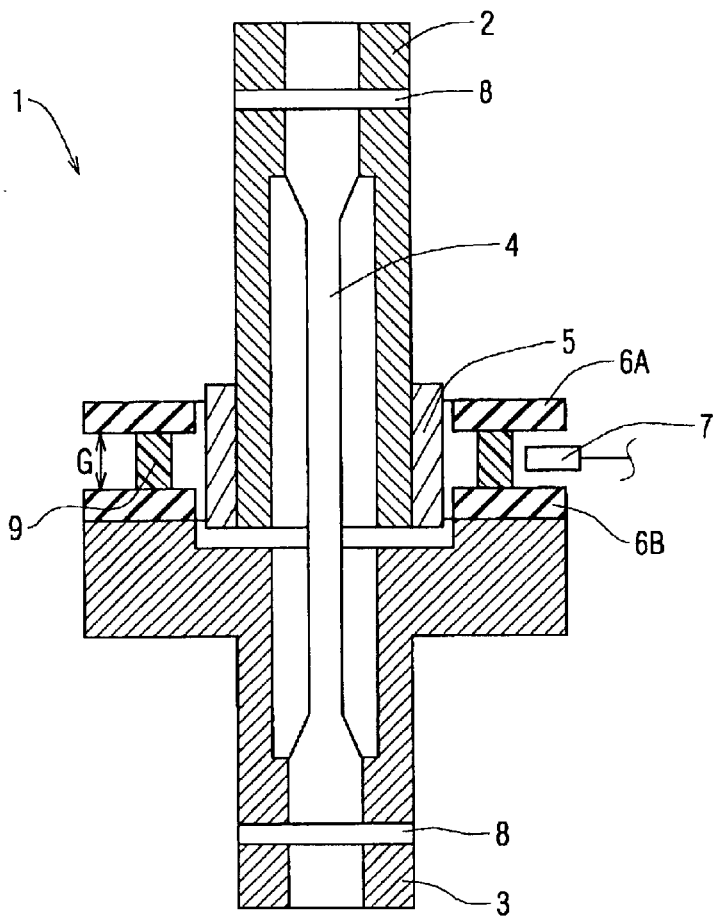
FIG. 15 is a cross-sectional view showing the torque sensor according to the third embodiment.
Figure 16A:
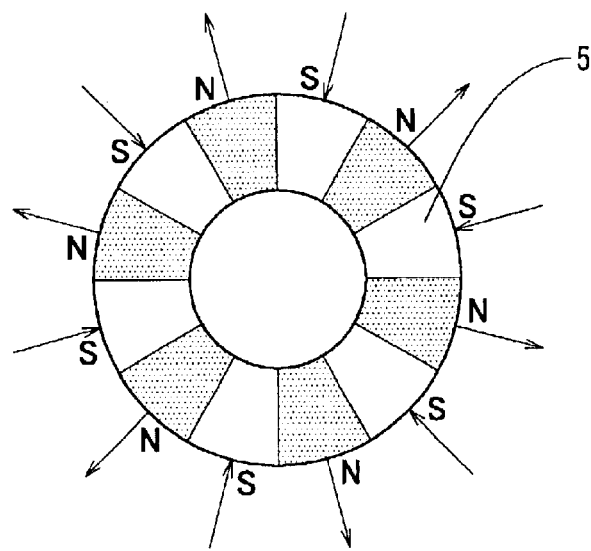
FIG. 16A is a schematic top plan view showing the magnet of the torque sensor in FIG. 14.
Figure 16B:
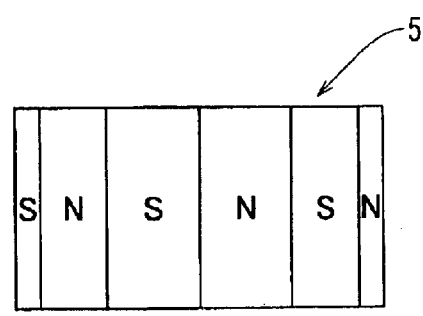
FIG. 16B is a side view showing the magnetic yoke and the magnet of the torque sensor in FIG. 14.

The torque sensor 1 according to the third embodiment is shown in FIGS. 14–19. In this torque sensor 1, N poles and S poles in the magnet 5 are magnetized alternately in the radial direction of the magnet 5, as shown in FIGS. 16A and 16B. As shown in FIG. 15, the magnetic yoke 6A, 6B is thicker than that in the first embodiment. The magnet 5 is also thicker than that in the first embodiment, so that both axial ends of the magnet 5 is protruded from the magnetic yokes 6A, 6B, respectively. The magnet 5 is disposed inside the upper and lower magnetic yokes 6A, 6B, so that the magnet 5 does not face the magnetic yokes 6A, 6B. The convexity portion 6a of the upper magnetic yoke 6A faces the concavity portion 6b of the lower magnetic yoke 6B, and similarly the concavity portion 6b of the upper magnetic yoke 6A faces the convexity portion 6a of the lower magnetic yoke 6B. This disposition is different from that in the first embodiment.

Figure 17A:
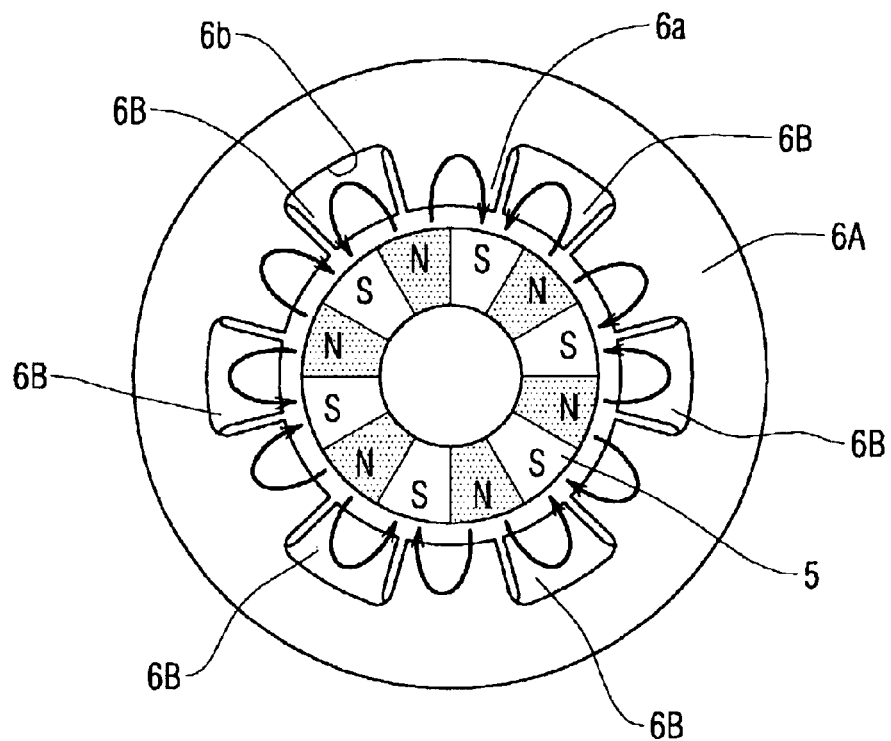
FIG. 17A is a schematic top plan view showing the magnetic yoke and the magnet of the torque sensor in FIG. 14.
Figure 17B:
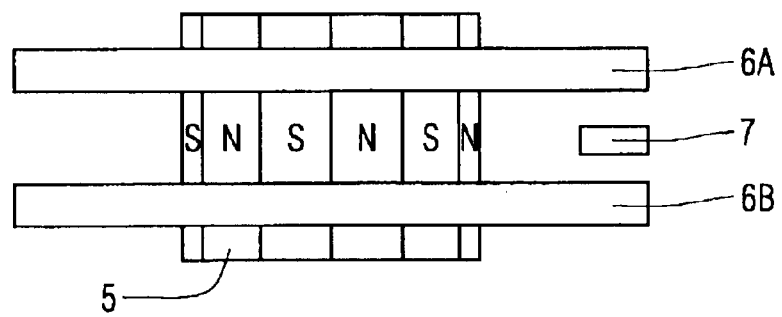
FIG. 17B is a side view showing the magnetic yoke and the magnet of the torque sensor in FIG. 14.

When the torsion bar 4 is not twisted, i.e., when the torque is not applied between the input shaft 2 and the output shaft 3, the center of each convexity or concavity in the convexity portion 6a or the concavity portion 6b is coincident with the boundary between the N pole and the S pole of the magnet 5, as shown in FIGS. 17A and 17B. Therefore, the number of magnetic field lines flowing from the N pole are equal to the number of magnetic field lines returning to the S pole, so that the magnetic field lines is shorted inside of each magnetic yoke 6A, 6B, respectively. As a result, the magnetic flux does not flow in the gap G between the upper and lower magnetic yokes 6A, 6B, and the magnetic sensor 7 detects no magnetic flux density, i.e., the magnetic flux density detected by the magnetic sensor 7 is almost zero.

Figure 18A:
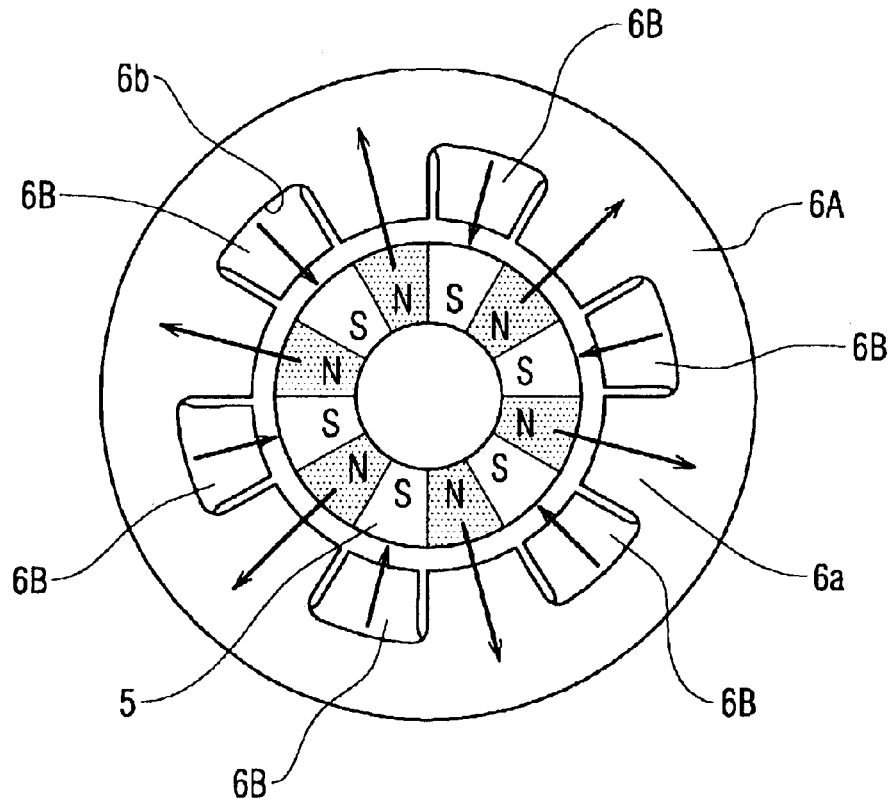
FIG. 18A is a schematic top plan view showing the magnetic yoke and the magnet of the torque sensor in FIG. 14.
Figure 18B:
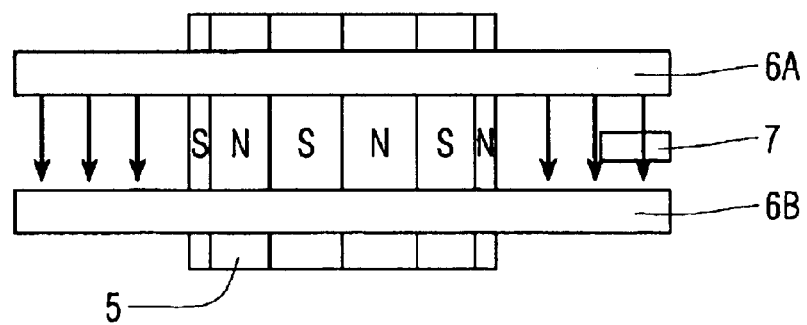
FIG. 18B is a schematic side view showing the magnetic yoke and the magnet of the torque sensor in FIG. 14.

When the torque is applied between the input shaft 2 and the output shaft 3, the torsion bar 4 is twisted. The pair of magnetic yokes 6A, 6B, which is fixed to the output shaft 3, rotates relatively against the magnet 5, which is fixed to the input shaft 2. Therefore, the center of each convexity or concavity in the convexity portion 6a or the concavity portion 6b is not coincident with the boundary between the N pole and the S pole of the magnet 5. When the torsion bar 5 rotates clockwise, the upper side of the N pole of the magnet 5 faces the convexity of the upper magnetic yoke 6A, and the lower side of the N pole faces the concavity of the lower magnetic yoke 6B, as shown in FIGS. 18A and 18B. In this case, the magnetic field lines flowing from the N pole increases inside of the upper magnetic yoke 6A, and the magnetic field lines returning to the S pole increases inside of the lower magnetic yoke 6B. Accordingly, the magnetic flux flows in the gap G, and the magnetic flux density increases from zero.

Figure 19A:
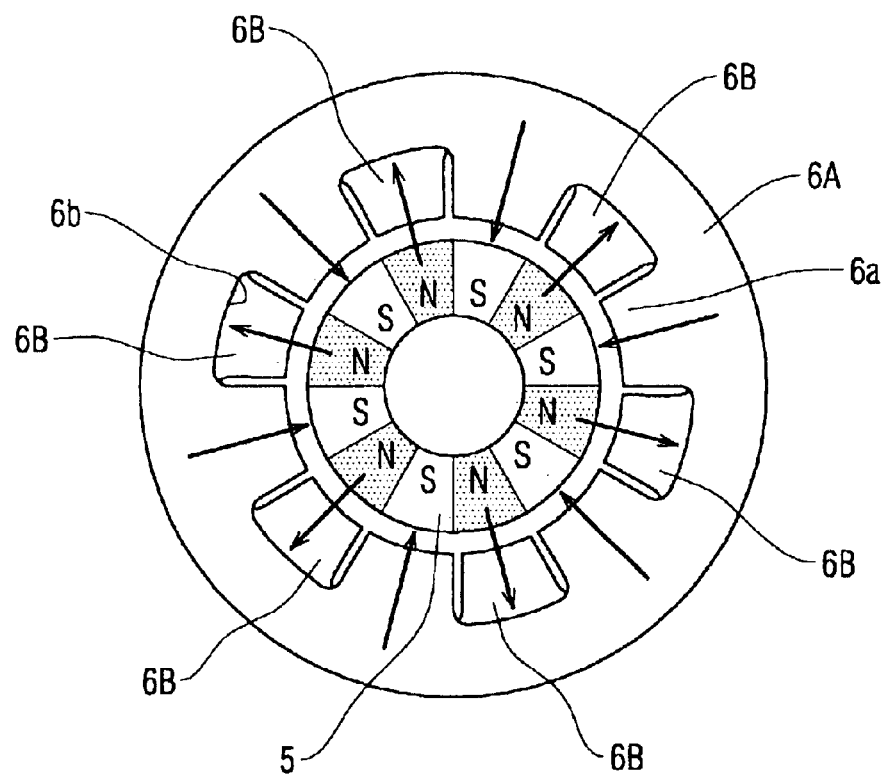
FIG. 19A is a schematic top plan view showing the magnetic yoke and the magnet of the torque sensor in FIG. 14.
Figure 19B:
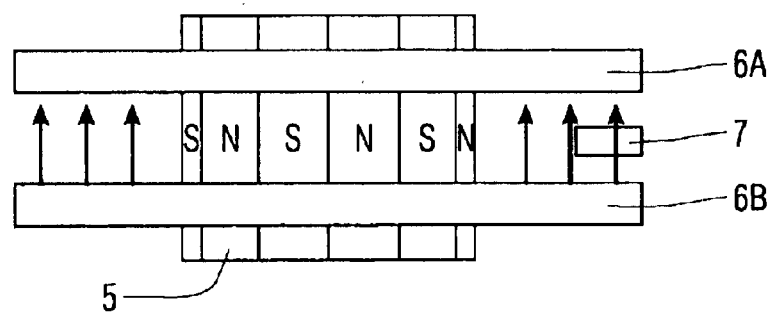
FIG. 19B is a schematic side view showing the magnetic yoke and the magnet of the torque sensor in FIG. 14.

When the torsion bar 5 rotates counter clockwise, the upper side of the N pole of the magnet 5 faces the concavity of the upper magnetic yoke 6A, and the lower side of the N pole faces the convexity of the lower magnetic yoke 6B, as shown in FIGS. 19A and 19B. In this case, the magnetic field lines returning to the S pole increases inside of the upper magnetic yoke 6A, and the magnetic field lines flowing from the N pole increases inside of the lower magnetic yoke 6B.

Accordingly, the magnetic flux flows in the gap G, and the magnetic flux density also increases from zero.

The magnetic flux density in the gap G is substantially in proportional to the distortion of the torsion bar 4. Moreover, the magnetic flux density reverses polarity in accordance with a rotational direction of the torsion bar 4. Therefore, the magnetic sensor 7 detects the magnetic flux density and the polarity as the rotational direction, and outputs a voltage signal in accordance with the magnetic flux density.

In the third embodiment, the magnetic yoke 6A, 6B is thicker than that in the first embodiment, so that the magnetic flux flowing from the magnet 5 can pass through the magnetic yoke 6A, 6B, even if the magnet 5 does not face the magnetic yoke 6A, 6B. Further, the pair of magnetic yokes 6A, 6B is disposed outside of the magnet 5, so that the distance between the pair of magnetic yokes 6A, 6B can be shortened. Therefore, the torque sensor 1 can be downsized in the axial direction. Moreover, the concentration ring 10 can be disposed on the outer circumference end of the magnetic yokes 6A, 6B, similar to the torque sensor 1 in the second embodiment. Thus, the magnetic sensor 7 detects the concentrated magnetic flux density between the concentration portions 10a. Therefore, a total magnetic flux flowing from the entire circumference of the magnetic yoke 6A, 6B is summed up and averaged, and the magnetic flux density is concentrated.

What is claimed is:

1. A torque sensor, comprising:

a rod twistable in accordance with a distortion torque between one axial end and the other axial end of the rod;

a magnet magnetized in an axial direction of the rod and fixed to one axial end of the rod;

first and second ring plates fixed to the other axial end of the rod and facing each other in the axial direction for sandwiching the magnet; and a magnetic sensor disposed in a gap between the first and second ring plates for detecting a magnetic flux density in the gap, wherein each of the first and second ring plates includes an aperture, the aperture is alternately disposed in a circumferential direction of each ring plate, the aperture of the first ring plate faces the aperture of the second ring plate in the axial direction, and the first and second ring plates are rotatable against the magnet in accordance with a twist of the rod.

2. A torque sensor according to claim 1, wherein the rod includes first and second shafts and an elastic shaft, the elastic shaft connects the first and second shafts coaxially and is twistable in accordance with a distortion torque between the first and second shafts, the magnet is fixed to the first shaft, and the first and second ring plates are fixed to the second shaft.

3. A torque sensor according to claim 2, wherein the magnet is made of hard magnetic material so that the magnet provides a magnetic field around the magnet, the first and second ring plates are made of soft magnetic material, and are disposed in the magnetic field provided by the magnet, each aperture of the first and second ring plates includes an opening, respectively, the opening is disposed in a circumferential direction of each ring plate, the opening of the first ring plate faces the opening of the second ring plate in the axial direction, and the first and second ring plates are rotatable against the magnet in accordance with a twist of the elastic shaft so that the rotation of the first and second ring plates causes the magnetic flux density in the gap.

4. A torque sensor according to claim 3, wherein the opening includes a plurality of holes, and the plurality of holes are alternately disposed in the circumferential direction so that the plurality of holes have a rotational symmetry around the axial direction.

5. A torque sensor according to claim 3, wherein each ring plate has a first distance defined between an outer circumference end and the opening in each ring plate, each ring plate has a second distance defined between the opening and an inner circumference end in each ring plate, and the first distance is larger than the second distance.

6. A torque sensor according to claim 5, wherein the magnet sensor is dispose between the outer circumference end and the opening in each ring plate.

7. A torque sensor according to claim 1, wherein the magnet is made of hard magnetic material so that the magnet provides a magnetic field around the magnet, the first and second ring plates are made of soft magnetic material, and are disposed in the magnetic field provided by the magnet, and the rotation of the first and second ring plates causes the magnetic flux density in the gap.

8. A torque sensor according to claim 1, wherein each aperture of the first and second ring plates includes a convexity and a concavity, the convexity and the concavity are alternately disposed in a circumferential direction of each ring plate, the convexity of the first ring plate faces the convexity of the second ring plate in the axial direction, and the concavity of the first ring plate faces the concavity of the second ring plate, and the first and second ring plates are rotatable against the magnet in accordance with a twist of the elastic shaft so that the rotation of the first and second ring plates causes the magnetic flux density in the gap.

9. A torque sensor according to claim 8, wherein the convexity and the concavity of each ring plate are alternately disposed in an inner circumference of each ring plate.

10. A torque sensor according to claim 8, wherein the magnet has a pair of N pole and S pole, and a total number of the convexity and the concavity in each ring plate are equal to a number of pairs of N pole and S pole in the magnet.

11. A torque sensor according to claim 10, wherein the total number of convexity and concavity in each ring plate are twelve.

12. A torque sensor according to claim 8, wherein the convexity and the concavity are disposed on an entire inner circumference of each ring plate at regular angular intervals so that the convexity and the concavity have the same width in the circumferential direction, the magnet has a N pole and a S pole that are disposed in a circumferential direction of the magnet at regular angular intervals so that the N pole and the S pole have the same width in the circumferential direction, and the width of the convexity is substantially equal to the width of the N pole in the circumferential direction.

13. A torque sensor according to claim 8, wherein each convexity and concavity has a center in the circumferential direction, respectively, the magnet has a N pole and a S pole with a boundary between the N pole and the S pole in the circumferential direction, and the center of each convexity and concavity is substantially coincident with the boundary between the N pole and the S pole.

14. A torque sensor according to claim 8, wherein the magnet partially faces the convexity in each ring plate.

15. A torque sensor according to claim 1, further comprising a spacer, wherein the spacer is made of nonmagnetic material, is sandwiched between the first and second ring plates, and is disposed outside of the magnet.

16. A torque sensor according to claim 1, further comprising a plurality of concentration rings, wherein each concentration ring is made of soft magnetic material, each concentration ring is disposed on the first and second ring plates, respectively, so that each concentration ring concentrates a magnetic flux flowing from the magnet through each ring plate, respectively, and the magnetic sensor is disposed between the concentration rings so that the magnetic sensor detects the magnetic flux density concentrated by the concentration rings.

17. A torque sensor according to claim 16, wherein each concentration ring faces each other in the axial direction, each concentration ring has a concentration portion at a predetermined position of the circumference end of each ring plate, each concentration portion is protruded from each concentration ring so that each concentration portion approaches each other, and the magnetic sensor is disposed between the concentration portions.

18. A torque sensor according to claim 1, wherein the magnetic sensor is a Hall element, a Hall integrated circuit, or a magneto-resistance device.

19. A torque sensor according to claim 1, wherein the magnet has a cylindrical shape.

20. A torque sensor according to claim 1, wherein the magnetic sensor does not contact the first and second ring plates or the magnet.

21. A torque sensor, comprising:

first and second shafts;

an elastic shaft connecting the first and second shafts coaxially and twistable in accordance with a distortion torque between the first and second shafts;

a magnet made of hard magnetic material, magnetized so that the magnet provides a magnetic field around the magnet, and fixed to the first shaft;

first and second ring plates made of soft magnetic material, disposed in a magnetic field provided by the magnet, fixed to the second shaft, and facing each other in the axial direction; and a magnetic sensor disposed in a gap between the first and second ring plates so that the magnetic sensor detects a magnetic flux density in the gap, wherein the magnet has a N pole and a S pole that are disposed alternately in a circumferential direction of the magnet, the magnet is disposed inside the first and second ring plates, two axial ends of the magnet are protruded from the first and second ring plates, respectively, each of the first and second ring plates includes a convexity and a concavity in an inner circumference of each ring plate, the convexity and the concavity are alternately disposed in a circumferential direction of each ring plate, the convexity of the first ring plate faces the concavity of the second ring plate in the axial direction, and the concavity of the first ring plate faces the convexity of the second ring plate, and the first and second ring plates are rotatable against the magnet in accordance with a twist of the elastic shaft so that the rotation of the first and second ring plates causes the magnetic flux density in the gap.

* * * * *